(12) United States Patent
Ghatge

(10) Patent No.: US 7,618,097 B2
(45) Date of Patent: Nov. 17, 2009

(54) SEAT BELT GUIDE AND ASSEMBLY

(76) Inventor: Ramesh Ghatge, Birch Dene, The Copse Hartopp Road, Sutton Coldfield (GB) B74 2RH ( * ) Notice: Subject to any disclaimer, the term of this patent is extended or adjusted under 35 U.S.C. 154(b) by 13 days.

(21) Appl. No.: 12/015,526

(22) Filed: Jan. 17, 2008

(65) Prior Publication Data
US 2009/0008983 A1 Jan. 8, 2009

(30) Foreign Application Priority Data
Jul. 4, 2007 (GB) .................................. 0712892.9

(51) Int. Cl.
B60R 22/30 (2006.01)
B60R 22/00 (2006.01)
B60R 21/00 (2006.01)
B60R 21/02 (2006.01)

(52) U.S. Cl. .................. 297/473; 297/481; 297/482

(58) Field of Classification Search ............... 297/481, 297/482, 473; 248/287.1, 229.1, 228.1, 230.1
See application file for complete search history.

(56) References Cited

U.S. PATENT DOCUMENTS

| | | | |
|---|---|---|---|
| 4,648,625 A * | 3/1987 | Lynch | 297/483 X |
| 5,845,967 A * | 12/1998 | Kane et al. | 297/473 X |
| 6,669,302 B2 * | 12/2003 | Warner et al. | 297/483 |
| 6,880,893 B1 | 4/2005 | Scotton | |
| 7,314,235 B2 * | 1/2008 | Downey | 297/483 X |
| 2007/0040371 A1 * | 2/2007 | Armstrong | 297/481 X |

FOREIGN PATENT DOCUMENTS

| | | |
|---|---|---|
| DE | 43 40 337 A1 | 6/1994 |
| DE | 10 2005 033 367 B3 | 10/2006 |
| FR | 2 778 882 A1 | 11/1999 |
| JP | 6-344858 A | 12/1994 |
| JP | 2001-301507 A | 10/2001 |

OTHER PUBLICATIONS

Autosafe Products Ltd., Safety Hug, http://www.autosafe.products.co.uk/introduction.html and www.cgi.ebay.co.uk/ws/eBayISAPI.dll?ViewItem&item=140107419443 (Apr. 19, 2007).

* cited by examiner

Primary Examiner—Rodney B White
(74) Attorney, Agent, or Firm—Young & Thompson

(57) ABSTRACT

A vehicle seat belt guide includes a substantially rigid and elongate support body having at least one anchor position for enabling the seat belt guide to be supported by a support member extending from a vehicle seat back to a headrest, and the elongate support body including a guide formation which extends along at least part of the length of the support body and along which a seat belt diverter is movable in a direction substantially perpendicular to the direction in which the support member extends from a vehicle seat back to a headrest, and clamping part to secure the belt diverter in a required position relative to the elongate support body.

11 Claims, 2 Drawing Sheets

SEAT BELT GUIDE AND ASSEMBLY

BACKGROUND OF THE INVENTION

This invention relates to a vehicle seat belt guide and to a vehicle seat assembly comprising a seat belt guide of the present invention.

DESCRIPTION OF THE RELATED ART

A commonly arising problem with seat belts is that the anchor positions for the belt have either no or only limited scope for adjustment of their position. This can be a particular disadvantage in the case of three point type seat belts such as those of the lap and diagonal type. Depending on the size and seating position of a vehicle occupant, and particularly in the case of young or small vehicle occupants, the upper part of the diagonal section of a three point type seat belt is likely to be inappropriately positioned and in consequence may in itself present a safety hazard.

It is known to provide vertical adjustment for the top of the diagonal section of a seat belt by means of a guide which slides vertically in a track provided in a door pillar.

Other proposals, particularly to address the potential problems of using a standard three point seat belt for children, include providing an auxiliary belt which extends alongside and is supported by the diagonal section of the three point belt. One such example is the Autosafe seat belt height adjuster of Autosafe Products Limited.

Another proposal to accommodate the requirements of children is in the form of a restraint harness which is fitted between the lap and diagonal sections, at the front of the child, and is intended to reposition the diagonal section of the seat belt to suit the child's smaller body frame.

Whilst the aforementioned proposals appear, in normal use, to act to preferentially position the seat belt, for example such that it does not contact and chafe the occupant's neck, in an emergency situation when subject to high forces the aforementioned means are likely to fail to maintain the seat belt in the optimum position. Indeed, it is possible that the seat belt becomes displaced to a position at which it presents a greater safety hazard.

SUMMARY OF THE INVENTION

The present invention seeks to provide a safety belt guide and safety belt assembly which enables the seat bell, for example the diagonal section of a three point seat belt, to be firmly retained in a preferred position both during normal use and also in an emergency situation when subject to high stress levels.

In accordance with one aspect of the present invention there is provided a vehicle seat belt guide comprising a support body having at least one anchor position and a seat belt diverter supported by and selectively positionable relative to the support body, said support body being of a substantially elongate form and substantially rigid, the or each said anchor position of the support body being adapted in use to engage with and be supported by a support member extending from a vehicle seat back to a headrest and said support body comprising a guide formation which extends along at least a part of the length of the elongate support body whereby, in use, the seat belt diverter is movable laterally relative to the direction in which the support member extends from a vehicle seat back to a headrest, the seat belt guide further comprising clamping means to secure the belt diverter in a required position relative to the support body.

Preferably the direction in which, in use, the seat belt diverter is movable laterally is a direction substantially horizontal and perpendicular to the normal direction of travel of the vehicle.

The guide formation may be of a kind which permits telescopic movement of a part of the seat belt diverter relative to the support body. The clamping means may operate to secure said part of the seat belt diverter relative to the support body. However, in an alternative construction the guide formation may be in the form of a track formation, such as a toothed track, along which the seat belt diverter is movable laterally relative to the direction in which the support member extends. The clamping means may operate to secure the seat belt diverter in a required position along said track.

Commonly the headrest is supported by a pair of vertically extending support rods, though other configurations such as a single support plate are envisaged as alternatives to said support rods. Depending on the form of the headrest support, the support body of the seat belt guide may be provided with a pair of apertures spaced along the length of an elongate support body and each to accommodate a support rod, or a single elongate aperture may be provided thereby to enable the headrest support(s) to extend through and provide support for the support body.

A particular feature of the present invention is that irrespective of whether the support body is of a substantially rigid or flexible type, it may be employed to utilise the structural rigidity of the headrest support(s) to allow the upper region of the diagonal section of a three point belt to be selectively adjusted in a transverse direction, that is the direction of the width of the vehicle seat.

Although the present invention specifically teaches that the position of the upper end of the seat belt diagonal section shall be adjustable in said transverse direction, it is envisaged that additionally auxiliary adjustment means may be provided to facilitate, in use, adjustment of the position of the upper end in a vertical direction and/or in a horizontal, to and fro direction.

The present invention further provides a vehicle seat belt assembly comprising a seat belt, a vehicle seat, a headrest secured to and supported by the vehicle seat by means of at least one substantially vertically extending headrest support, and a seat belt diverter secured by and adjustable in position, in said transverse direction, relative to the headrest support.

BRIEF DESCRIPTION OF THE INVENTION

One embodiment of the present invention will now be described, by way of example only, with reference to the accompanying diagrammatic drawings in which.

DETAILS OF THE PREFERRED EMEODIMENTS

Figure 1:
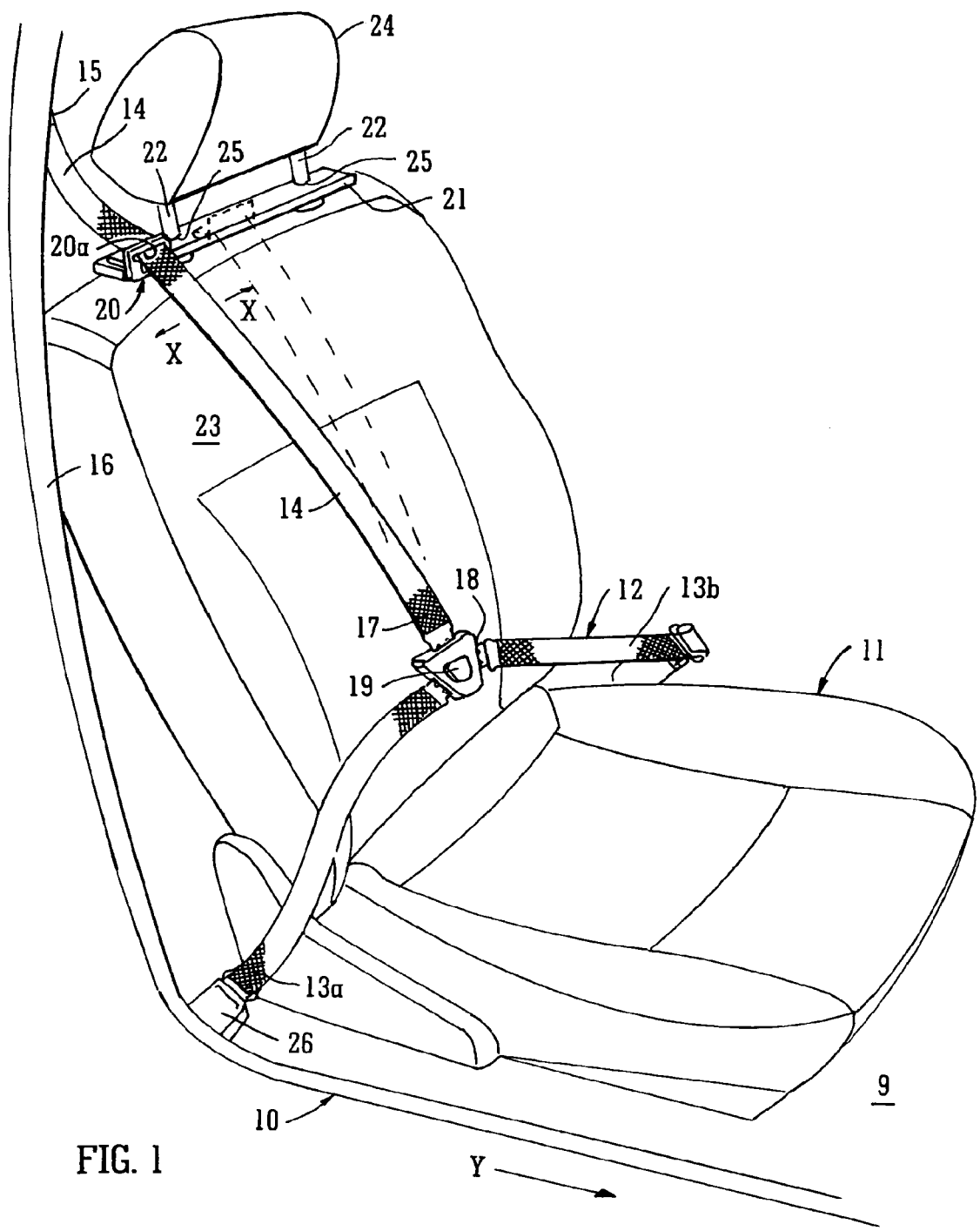
FIG. 1 is a perspective view of a part of a vehicle and a vehicle seat assembly comprising a seat belt guide of the present invention.

A vehicle 10 comprises a seat 11 secured to the vehicle floor pan 9 in known manner, and a three point lap and diagonal seat belt 12.

The seat belt 12 comprises two lap section parts 13a, 13b and a diagonal section 14. Each lap section part 13a, 13b may be anchored relative to either the vehicle seat 11 to be movable therewith to and fro in the direction Y, or it may be anchored relative to the vehicle body, e.g. to the floor pan point 26. One end region 15 of the diagonal section is supported by a door pillar 16 which contains a conventional inertia reel mechanism for tensioning and control of the belt. The other end 17 of the diagonal section is secured to the lap section parts at a position 18 between the two lap section parts 13a, 13b. A buckle 19 is provided in known manner at the position 18 between the two lap section parts to enable them to be secured together and released as required.

In accordance with the present invention the seat belt assembly additionally comprises a belt diverter 20 which enables the position of the diagonal section to be adjusted in a transverse direction X-X of the vehicle (see FIG. 1), at a position between the operative end regions 15, 17 of the diagonal section 14.

In this embodiment of the invention the diverter 20 is in the form of a guide having a slot 20a (see FIG. 3) through which the diagonal section 14 of the belt is able to slide freely. The diverter is secured in a toothed track 30 (see FIG. 3) provided by a support bar 21 which in turn is supported by the pair of rods 22 which extend between the back 23 of the seat and the headrest 24. The bar 21 is provided with a pair of apertures 25 through which the support rods 22 extend and through which the support rods are slideable so that vertical adjustability of the headrest is not impaired.

Figure 2:
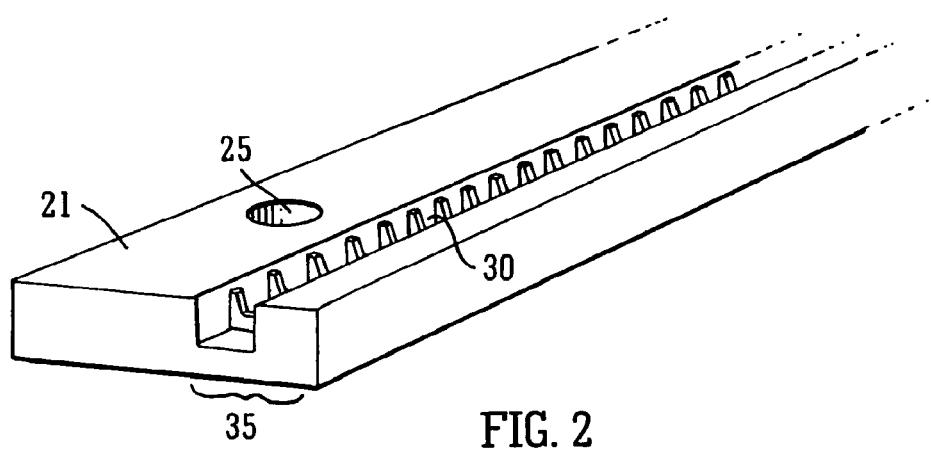
FIG. 2 is a perspective view of part of the support bar of the assembly of FIG. 1.
Figure 3:
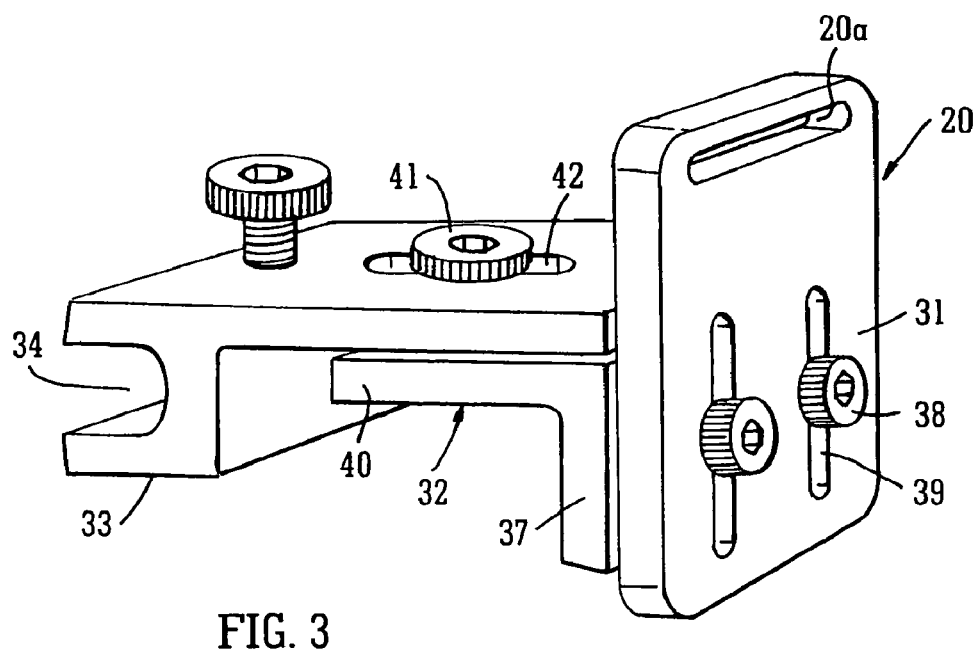
FIG. 3 is a perspective view showing in detail the diverter 20 if the assembly of FIG. 1.

The diverter 20 is shown in more detail in FIGS. 2 and 3 and comprises a guide section 31 formed with the aforementioned belt slot 20a, an intermediate section 32 and an attachment section 33.

The attachment section 33 defines a channel 34 to receive the track part 35 of the support bar 21, and provides location for a clamp screw 36 which can be tightened to firmly engage in a notch in the toothed track 30.

The intermediate section 32 is in the form of an L section member and enables the position of the slot 20a to be adjusted in the vertical direction and the for and aft direction Y in addition to the adjustment in the transverse direction XX as provided for by the toothed track 30. For vertical adjustment one limb 37 of the section 32 is provided with a pair of screw threaded apertures to receive clamp screws 38 which each extend through a respective one of a pair of vertical slots 39 in the guide section 31. For fore and aft adjustment the other limb 40 of the section 32 comprises a screw threaded aperture to receive a clamp screw 41 which extends through an adjustment slot 42 in the attachment section 33.

In use of the seat belt assembly the seat belt is fastened around the seat occupant in a conventional manner and the diverter 20 is adjusted in the direction X-X such that the diagonal section 14 of the belt lies in the appropriate position, between the neck and the off-side shoulder of the occupant. In contrast to hitherto known devices such as those discussed above, even in the event of an emergency and the seat belt being subjected to high loads, the diverter 20 is able firmly to retain the diagonal section of the seat belt in a more advantageous position.

The diverter 20 described above allows for additional positional adjustment in the vertical and to and fro (Y) directions, but it is to be understood that those adjustment facilities are optional and also that other constructional arrangement s may be provided to afford adjustment capability in one or both of said directions additional to the side ways adjustment facility provided by the support bar 21.

The invention claimed is:

1. A vehicle seat belt guide comprising:
    a support body having at least one anchor position, said support body being substantially elongated and substantially rigid, the support body being adapted in use to engage with and be supported by a support member extending from a vehicle seat back to a headrest;
    a belt diverter supported by and selectively positionable relative to the support body,
    a guide formation which extends along at least a part of a length of the support body whereby, in use, and with the support body extending substantially perpendicular to the normal direction of travel of the vehicle, the seat belt diverter is movable laterally relative to the direction in which the support member extends from a vehicle seat back to a headrest; and
    clamping means to secure the belt diverter in a required position relative to the support body.

2. A seat belt guide according to claim 1, wherein the support body comprises at least one aperture through which the support member may extend to interconnect between the vehicle seat back and the headrest.

3. A seat belt guide according to claim 2, wherein said support body comprises a pair of apertures spaced along the length of the support body.

4. A seat belt guide according to claim 1, wherein the guide formation is a track formation along which the seat belt diverter is movable.

5. A seat belt guide according to claim 4, wherein the track formation comprises a toothed track.

6. A seat belt guide according to claim 4, wherein the clamping means is operable to secure the seat belt diverter in a chosen position along said track.

7. A seat belt guide according to claim 1, wherein the guide formation permits telescopic movement between the seat belt diverter and the support body.

8. A seat belt guide according to claim 7, wherein the clamping means is operable to secure the seat belt diverter relative to the support body.

9. A seat belt guide according to claim 1, and comprising auxiliary adjustment means to facilitate adjustment of the position of an upper end of seat belt diagonal section in a direction substantially perpendicular to said direction of relative lateral movement of the belt diverter and support body.

10. A vehicle seat belt assembly, comprising:
    the seat belt diverter according to claim 1,
    a seat belt,
    a vehicle seat comprised of the vehicle seat back and the headrest, a headrest support securing the vehicle seat back to the headrest serving as the support member, and
    the seat belt diverter secured by and adjustable in position relative to the headrest support in a direction which is substantially horizontal and perpendicular to the normal direction of movement of the vehicle.

11. A vehicle seat belt assembly comprising:
    a seat belt with a seat belt diagonal section,
    a vehicle seat,
    a headrest secured to and supported by the vehicle seat by at least one substantially vertically extending headrest support, and
    a seat belt diverter secured by and adjustable in position relative to the headrest support in a direction which is substantially horizontal and perpendicular to the normal direction of movement of the vehicle, and comprising auxiliary adjustment means whereby a position of an upper end of the seat belt diagonal section may be adjusted additionally in a direction substantially perpendicular relative to said direction of relative lateral movement of the belt diverter and support body.

* * * * *